(12) United States Patent
Robinson et al.

(10) Patent No.: US 7,978,139 B2
(45) Date of Patent: Jul. 12, 2011

(54) DIRECTION FINDING AND GEOLOCATION OF WIRELESS DEVICES

(75) Inventors: Tyler Robinson, Merrimack, NH (US);
Peter Dusaitis, Manchester, NH (US);
John J. Kelly, Groton, MA (US);
Joseph Warner, Burlington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 188 days.

(21) Appl. No.: 12/487,511

(22) Filed: Jun. 18, 2009

(65) Prior Publication Data
US 2010/0321242 A1    Dec. 23, 2010

(51) Int. Cl.
*G01S 3/02* (2006.01)
(52) U.S. Cl. ......................................... 342/450; 342/451
(58) Field of Classification Search .................. 342/450, 342/451
See application file for complete search history.

(56) References Cited

U.S. PATENT DOCUMENTS

| | | | |
|---|---|---|---|
| 4,594,595 A | 6/1986 | Struckman | |
| 6,670,920 B1 | 12/2003 | Herrick | |
| 6,772,213 B2 * | 8/2004 | Glorikian | 709/228 |
| 7,126,533 B2 | 10/2006 | Fiore et al. | |
| 7,233,285 B2 | 6/2007 | Struckman | |
| 7,268,728 B1 * | 9/2007 | Struckman | 342/424 |
| 7,292,198 B2 | 11/2007 | Shtrom et al. | |
| 7,358,891 B2 | 4/2008 | Struckman et al. | |
| 7,358,912 B1 | 4/2008 | Kish et al. | |
| 7,362,280 B2 | 4/2008 | Shtrom et al. | |
| 7,436,351 B2 | 10/2008 | Struckman et al. | |
| 7,453,400 B2 | 11/2008 | Struckman et al. | |
| 2006/0098616 A1 | 5/2006 | Kish et al. | |
| 2006/0109067 A1 | 5/2006 | Shtrom | |
| 2006/0192720 A1 | 8/2006 | Shtrom | |
| 2007/0026807 A1 | 2/2007 | Kish | |
| 2007/0197229 A1 | 8/2007 | Kalliola et al. | |
| 2007/0252666 A1 | 11/2007 | Shtrom | |
| 2008/0129640 A1 | 6/2008 | Shtrom et al. | |
| 2009/0047925 A1 * | 2/2009 | Rahman | 455/404.2 |
| 2010/0321240 A1 | 12/2010 | Dusaitis et al. | |
| 2010/0321244 A1 | 12/2010 | Kelly | |

OTHER PUBLICATIONS

"Crescent Vector OEM Board", Hemisphere GPS (2 pages).
"First Responder Interoperable Communications System", BAE Systems Electronics & Integration Solutions (5 pages).

(Continued)

*Primary Examiner* — Thomas H Tarcza
*Assistant Examiner* — Harry Liu
(74) *Attorney, Agent, or Firm* — Finch & Maloney, PLLC; Neil F. Maloney (57) ABSTRACT

Techniques are disclosed that allow for the detection, identification, direction finding, and geolocation of wireless emitters in a given multipath environment. For example, the techniques can be used to detect and identify a line of bearing (LOB) to an IEEE 802.11 emitter in a building or in an open field or along a roadside. Multiple LOBs computed from different geographic locations can be used to geolocate the target emitter. The techniques can be embodied, for instance, in a vehicle-based device that can survey the target environment, detect an IEEE 802.11 emitter and identify it by MAC address, and then determine various LOBs to that emitter to geolocate the emitter. In some cases, a sample array of response data from the target emitter is correlated to a plurality of calibrated arrays having known azimuths to determine the LOB to the target emitter.

26 Claims, 9 Drawing Sheets

OTHER PUBLICATIONS

"First Intercomm the First InterComm Solution", BAE Systems (1 page).
"Kismet (software)", Wikipedia, the free encyclopedia (2 pages).
"Kismet", Latest Kismet stable release, (24 pages).
Hippenstiel et al., Localization of Wireless Emitters Based on the Time Difference of Arrival (TDOA) and Wavelet Denoising (67 pages).
"MediaFlex FAQs", Ruckus Wireless (3 pages).
"The Ultimate Wireless Multimedia Solution for Service Provider", Ruckus Wireless (1 page).
"NetStumbler", Wikipedia, the free encyclopedia (1 page).
"Model 2+", OQO Products (1 page).
"RR7855 Radio Direction Finding System", Raven Research (8 pages).
"VAIO US Series Micro PC", Sony (2 pages).
"Yellowjacket-B 702.11b Wi-Fi Analysis System", Berkeley Varitronics Systems (2 pages).
Office Action Response filed Apr. 15, 2011 in U.S. Patent Publication No. 2010/0321240, 12 pages.
Office Action Response filed Apr. 15, 2011 in U.S. Patent Publication No. 2010/0321244, 13 pages.

* cited by examiner

DIRECTION FINDING AND GEOLOCATION OF WIRELESS DEVICES

RELATED APPLICATIONS

This application is related to U.S. application Ser. No. 12/487,469, filed Jun. 18, 2009, and titled "Direction Finding of Wireless Devices." This application is also related to U.S. application Ser. No. 12/487,485, filed Jun. 18, 2009, and titled "Tracking of Emergency Personnel." Each of these applications is herein incorporated by reference in its entirety.

FIELD OF THE INVENTION

The invention relates to wireless communications, and more particularly, to techniques for direction finding and/or geolocating wireless devices such as those configured with IEEE 802.11 emitters and other such detectable emitters.

BACKGROUND OF THE INVENTION

Conventional techniques for locating IEEE 802.11 emitters (e.g., access points as well as laptops with IEEE 802.11 capability and other such clients) are based on measuring the amplitude of the 802.11 emitter with a portable receiver, and moving around to find the direction in which the amplitude increases. The general assumption is that the stronger the signal amplitude, the closer the 802.11 emitter is believed to be. Several commercial devices were developed for this purpose (e.g., Yellowjacket® 802.11b Wi-Fi Analysis System).

There are a number of problems associated with such amplitude-based techniques for locating 802.11 emitters. For instance, the techniques tend to be highly inaccurate due to the incidence of RF multipath created by the RF waveforms emanating from the 802.11 emitters. These waveforms bounce off conductive objects or surfaces in the environment, which causes multiple false readings on increased amplitude (false directions) that then disappear as the user leaves the multipath. Thus, conventional amplitude-based locationing techniques will create many false high amplitude paths to the target that will be incorrect, and will not work in a high multipath environment, such as a neighborhood (e.g., street scene) or building (e.g., home, office building, or café).

There is a need, therefore, for techniques that allow for the detection, identification, direction finding, and geolocation of wireless emitters in a given environment.

SUMMARY OF THE INVENTION

One embodiment of the present invention provides a method for geolocating a wireless emitter. The method includes measuring one or more response signal parameters for each of Y antenna patterns, thereby providing a Y sample array of response data from a target wireless emitter, wherein Y is greater than 1 (e.g., Y=64 or 4096; any number of antenna patterns can be used). The method further includes correlating the sample array to a plurality of entries in a database of calibrated arrays having known azimuths, to determine a line of bearing (LOB) to the target wireless emitter. The method further includes repeating the transmitting, measuring and correlating to determine one or more additional LOBs to the target wireless emitter, each LOB computed from a different geographic location, and geolocating the target wireless emitter based on the LOBs. The method may further include the preliminary steps of surveying an area of interest to identify wireless emitters within that area (e.g., using established discovery protocols), and selecting a target emitter discovered during the survey. This selection may be, for example, based on user input, or done automatically based on some established selection scheme. In one particular case, the target emitter is associated with a media access control (MAC) address and communication channel learned during the survey. In one such case, the method further includes transmitting a stimulus signal to the target emitter using the MAC address and communication channel. In another particular case, the correlating includes generating a correlation plot having a peak using correlation factors resulting from correlation of the sample array to the plurality of entries in the database, identifying a target azimuth of the sample array based on the peak of the correlation plot, and determining the LOB to the target wireless emitter based on the target azimuth. In some cases, each of the LOBs is associated with position and heading tags provided by a global positioning satellite (GPS) module to assist in geolocating the target wireless emitter. The method may include graphically displaying the LOBs to the target wireless emitter, and/or storing the geolocation of the target wireless emitter. The one or more response signal parameters may include, for example, response signal amplitude. The method can be carried out, for example, using a vehicle-based device (e.g., truck, plane, ship, etc).

Another embodiment of the present invention provides a system for geolocating a wireless emitter. The system includes an antenna array for measuring one or more response signal parameters for each of Y antenna patterns, thereby providing a Y sample array of response data from a target wireless emitter, wherein Y is greater than 1. The system further includes a line of bearing module for correlating the sample array to a plurality of entries in a database of calibrated arrays having known azimuths, to determine a line of bearing (LOB) to the target wireless emitter. The system further includes a geolocation module for geolocating the target wireless emitter based on multiple LOBs to the target wireless emitter, each LOB computed from a different geographic location. The system may be further configured for surveying an area of interest to identify wireless emitters within that area. In one such case, the system includes a user interface for allowing a user to select a target emitter discovered during the survey. In another such case, the target emitter is associated with a media access control (MAC) address and communication channel learned during the survey. In one such case, the system includes a transceiver configured for transmitting a stimulus signal to the target emitter using the MAC address and communication channel. In another example case, the line of bearing module is configured for generating a correlation plot having a peak using correlation factors resulting from correlation of the sample array to the plurality of entries in the database, and identifying a target azimuth of the sample array based on the peak of the correlation plot, and determining the LOB to the target wireless emitter based on the target azimuth. In another example case, each of the LOBs is associated with position and heading tags provided by a global positioning satellite (GPS) module to assist in geolocating the target wireless emitter. The system may include a user interface for graphically displaying the LOBs to the target wireless emitter, and/or a database for storing the geolocation of the target wireless emitter. The system can be configured for vehicle-based operation. A number of variations on this system will be apparent in light of this disclosure.

The features and advantages described herein are not all-inclusive and, in particular, many additional features and advantages will be apparent to one of ordinary skill in the art in view of the drawings, specification, and claims. Moreover,

DETAILED DESCRIPTION OF THE INVENTION

Techniques are disclosed that allow for the detection, identification, direction finding, and geolocation of wireless emitters in a given multipath environment. For example, the techniques can be used to detect and identify multiple lines of bearing (LOBs) to IEEE 802.11 emitters in a building or in an open field or along a roadside. The multiple LOBs can be used to geolocate the target emitter. The techniques can be embodied, for instance, in a vehicle-based device that provides a rapid and accurate way to survey the target environment, detect active IEEE 802.11 emitters and identify them by MAC address, and then precisely determine LOBs to each of those emitters to locate them in or out of a building (or other multipath environment).

General Overview

Wireless communication devices, which are typically configured with a networking card or a built-in chip or chip set, are vulnerable to stimulation or otherwise exploitable for on-demand direction finding. Typical such wireless devices include, for example, laptop computers, cell phones and personal digital assistants (PDAs), access points and repeaters, and other portable communication devices. In addition, such devices typically include a physical address (e.g., MAC address) by which they can be identified and subsequently directly communicated with.

In accordance with one embodiment of the present invention, a system is provided for direction finding wireless devices (e.g., IEEE 802.11 a/b/g/n/etc capable devices, all channels). The system generally includes a wireless transceiver, a switchable antenna array, and a direction finding algorithm that correlates measured responses with calibrated responses to identify multiple LOBs to a target wireless device. The system further includes a geolocation algorithm. The wireless devices in the system's field of view (FOV) can be targeted based on their specific MAC address (or other suitable physical address or identifier).

In operation, the system initially carries out a survey process, where the system discovers or otherwise detects wireless emitters in its FOV. For instance, IEEE 802.11 discovery protocols can be used by the system to discover and handshake with each emitter in its FOV. During this discovery process, the system learns information associated with the various emitters, such as the responding emitter's media access control (MAC) address, service set identifier (SSID), and/or communication channel. In other embodiments, a network detector can be used to unobtrusively detect and interpret information being transmitted by wireless emitters in the FOV. Once this survey process is completed, the system can then selectively target each of the discovered emitters for direction finding and precise geolocation.

For instance, the system transmits a stimulus signal (e.g., an IEEE 802.11 compliant RF signal, or any suitable signal that will cause a desired response signal) to stimulate a target emitter based on that emitter's MAC address, and captures the response from the target emitter. The switchable antenna array of the system operates in synchronization with a transceiver, and allows for response signal detection over numerous antenna array configurations.

For example, an antenna array having six horizontally-polarized switchable elements has up to 64 different configurations (i.e., $2^6$). Other antenna array configurations will be apparent in light of this disclosure. In any such cases, one or more response signal parameters (e.g., amplitude, or amplitude and phase) can be detected for each of the Y antenna array configurations, so as to provide an array (having Y entries) of response signal data associated with the target emitter. The system's direction finding algorithm effectively converts this array of measurements into an LOB relative to the current position and orientation of array.

The geolocation algorithm can be used to accumulate two or more LOBs from different vantage points to geolocate the precise location of the emitter along an LOB (based on an intersection of the LOBs and/or global positioning satellite (GPS) position and heading tags associated with each computed LOB). The LOB and/or geolocation can be communicated to the user, for example, via a display or other suitable user interface. In one particular such embodiment, results can be visually depicted on a map display or polar plot to indicate in real-time the direction to and/or location of the target device. The user interface may be further configured to allow for control and tasking of the system, as will be apparent in light of this disclosure.

The system and techniques do not interfere with service to the target device (operation is effectively transparent to target device). In addition, the techniques work at the hardware layer regardless of device mode, thereby bypassing various impediments such as encryption techniques, MAC address filters, and hidden SSIDs. The system and techniques can be used for a number of applications, such as finding 802.11 emitters in rural and urban environments, or within a military zone. In addition, the system and techniques can be used for mapping publicly accessible access points (e.g., to identify unencrypted access points available for free use). For instance, a website dedicated to providing an on-line accessible database of known publicly accessible access points may provide a business model for generating revenue. In one such embodiment, revenue may be provided via fees received for online advertising posted on the website, such as advertisements related to the services and/or goods associated with the brick-and-mortar business that is providing the public access point. Other monetization schemes for such a database will be apparent in light of this disclosure.

A number of system capabilities and features will be apparent in light of this disclosure. For instance, the system can be implemented in a compact fashion thereby allowing for form factors amenable to vehicle-based or unmanned aerial vehicle (UAV) configurations, and can be employed to survey, detect, identify, direction find, and geolocate wireless emitters (e.g., 802.11 access points and clients, cell phones, PDAs, etc). The LOB to and/or geolocation of such target emitters can be identified from within the same building or from outside a building or in an outdoor area or other multipath environments, thereby providing the capability for precise locationing.

Other emitters vulnerable to stimulation (e.g., Bluetooth emitters) and characterization can be detected using the techniques described herein, and the present invention is not intended to be limited to IEEE 802.11 emitters. In addition, note that the number of antenna configurations provided will depend on the number of switchable elements included in the array and whether or not those elements are vertically-polarized and/or horizontally-polarized. For instance, an antenna array having six switchable elements that are each both vertically-polarized and horizontally-polarized has up to 4096 different configurations (i.e., $2^{12}$).

Wireless Emitter Locating System

Figure 1:
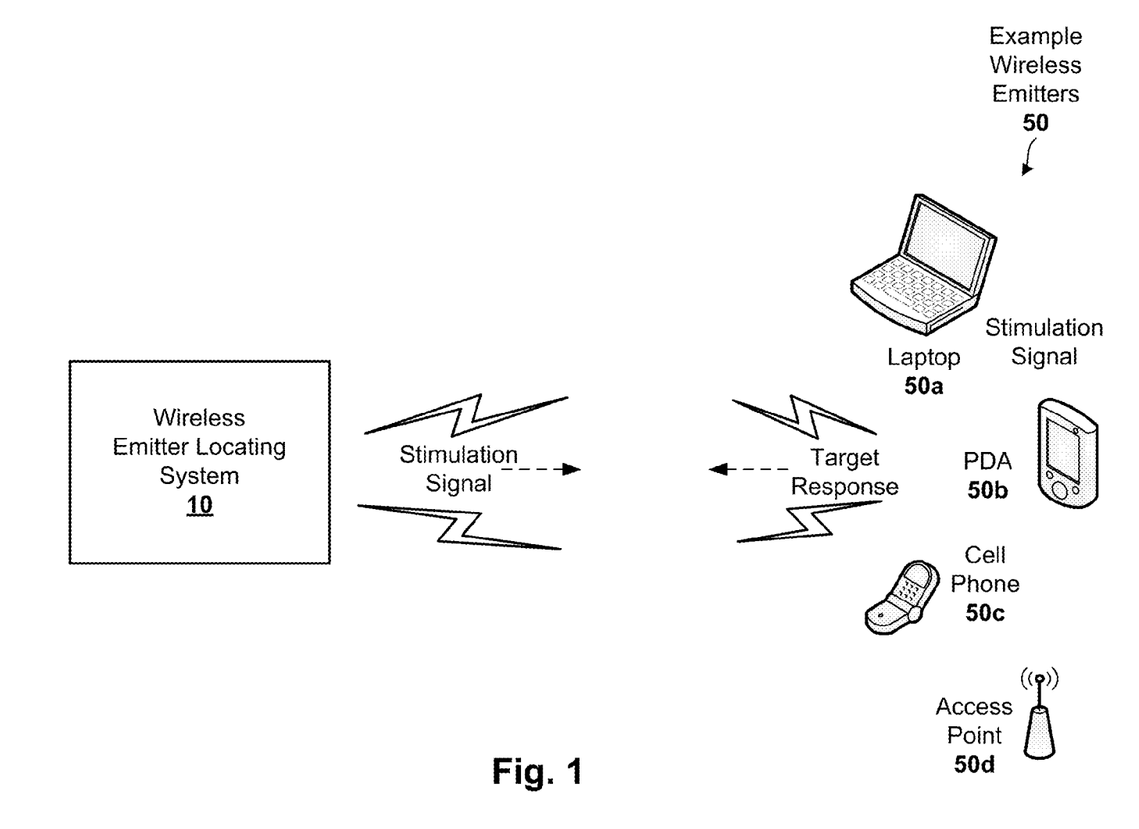
FIG. 1 illustrates a wireless emitter locating system configured in accordance with an embodiment of the present invention.

FIG. 1 illustrates a wireless emitter locating system 10 configured in accordance with an embodiment of the present invention. The system 10 can be implemented, for example, in a vehicle-based platform to allow for portable direction finding and/or geolocationing in multipath environments.

As can be seen, system 10 is capable of transmitting stimulus signals to its field of view (FOV), and receiving responses from any number of wireless emitter devices 50 located in that FOV. The example wireless emitter devices 50 depicted include laptop 50a, PDA 50b, cell phone 50c, and wireless access point 50d. Each of these devices 50 can be, for example, IEEE 802.11 compliant wireless emitters. In a more general sense, devices 50 can operate in accordance with any wireless communication protocol that allows, for instance, discovery based on an established handshake or other messaging technique by which devices 50 and system 10 make their existence known to each other to establish communication links there between. Other detection techniques, whether based on such two-way messaging schemes or one-way covert detection mechanisms, will be apparent in light of this disclosure.

Thus, system 10 may initially transmit a stimulus signal to survey the currently available devices 50. The survey signal transmitted by system 10 may be responsive to signals being transmitted by the devices 50, or may be the initiating signal that wakes-up devices 50 so that they can respond in accordance with an established wireless communications protocol. During such discovery processes, the devices 50 may share information about themselves with system 10. For instance, devices 50 that are compliant with IEEE 802.11 may share information including their MAC address, SSID, channel, and current encryption status (e.g., encrypted or not encrypted). In other embodiments, the discovery process can be covert or otherwise transparent to the wireless emitters 50 in the FOV. For instance, a network detector (such as KISMET or NETSTUMBLER) can be used to detect and interpret information being transmitted by wireless emitters in the FOV, thereby allowing information such as MAC address, SSID, channel, and current encryption status to be identified. Thus, pertinent information about the potential target wireless emitters 50 in the system's FOV can be acquired by a survey that uses at least one of discovery protocols and/or network detection techniques, and the system 10 can then communicate with specific ones of the various available target wireless devices 50, so as to direction find and/or geolocate that target device.

The devices 50 can be located, for example, in a building or outdoors in a park area or along a roadside. The system 10 can be located in the same building, a different building, or outside as well. In short, system 10 can direction find and geolocate devices 50 regardless of the environment (multipath or not) associated with the respective locations of system 10 and devices 50. The distance between the system 10 and devices 50 can vary depending on factors such as transmit power and the communication protocols employed. In an embodiment using IEEE 802.11 communication protocols, the distance can be, for instance, out to hundreds of meters.

Figure 2A:
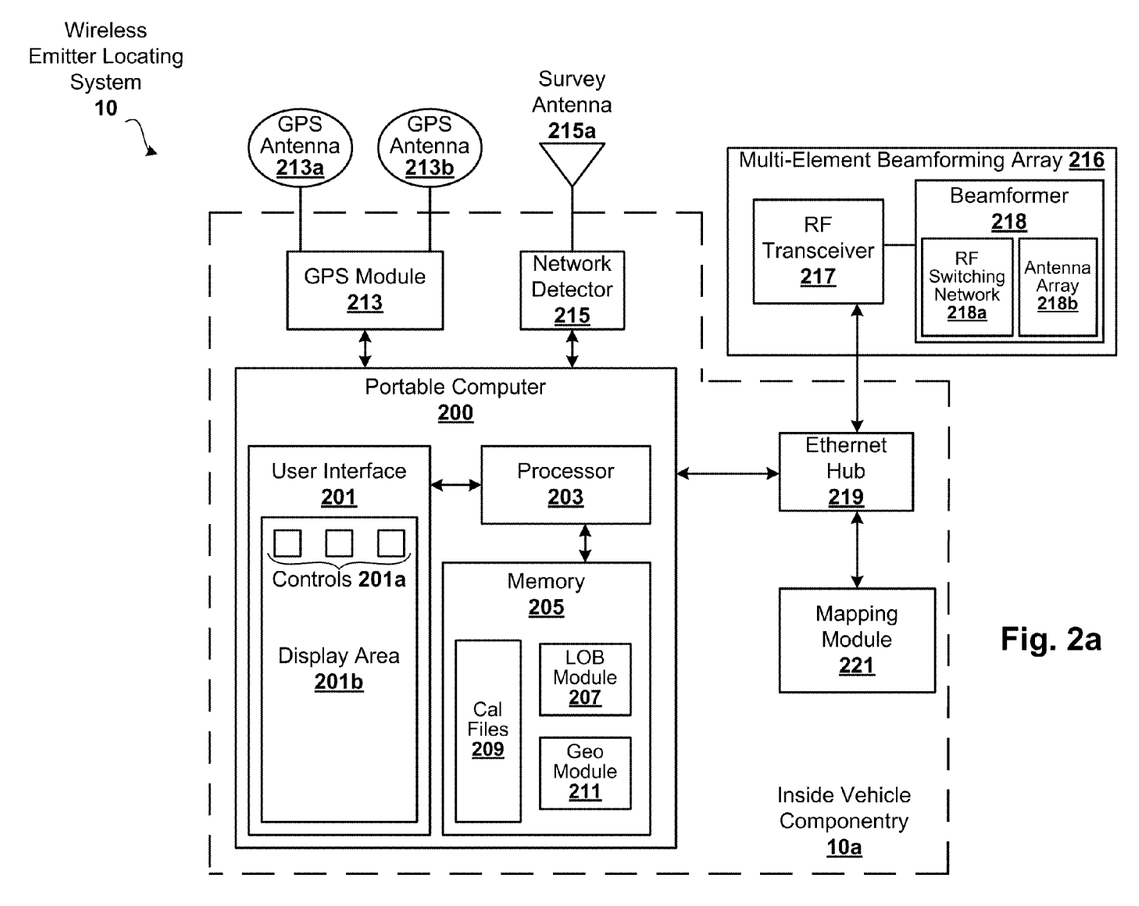
FIG. 2a illustrates a detailed block diagram of the wireless emitter locating system shown in FIG. 1, configured in accordance with an embodiment of the present invention.

FIG. 2a illustrates a detailed block diagram of the wireless emitter locating system 10, configured in accordance with an embodiment of the present invention. As previously explained with reference to FIG. 1, the system 10 is capable of identifying potential target emitter devices, and computing one or more LOBs to a target device. The system can then geolocate the target device on the LOB, based on an intersection of LOBs from multiple vantage points and/or GPS position and heading tags associated with each computed LOB, as will be discussed in turn.

As can be seen, the system 10 generally includes a computer 200, a multi-element beamforming array 216, a GPS module 213 and GPS antennas 213a-b, a network detector 215 and omni-directional survey antenna 215b, an Ethernet hub 219, and an optional mapping module 221. The multi-element beamforming array 216 includes an RF transceiver 217 and a beamformer 218 that includes an RF switching network 218a and a multi-element antenna array 218b. The computer 200 includes a user interface 201 having controls 201a and display area 201b, a processor 203, and a memory 205. The memory 205 includes calibration files 209, a LOB module 207, and a geolocation (Geo) module 211. Other conventional componentry not shown will be apparent in light of this disclosure (e.g., busses, storage mechanisms, co-processor, graphics card, operating system, user interface mechanisms, etc). The system may be powered by batteries, or may derive its power from other sources, such as a vehicle in which the system is operating. A number of suitable power schemes can be used here.

The RF transceiver 217 generates RF signals to stimulate a target emitter (e.g., based on MAC address of emitter) and captures response signals from the target emitter. The multi-element antenna array 218b is capable of providing coverage of the spectrum of interest in azimuth (horizontal field of view), and optionally in elevation (vertical field of view) and polarization (frequency), if so desired. The RF switching network 218a is configured to select elements of the antenna array 218b (based on control signals provided by computer 200) in synchronization with the transceiver 217. The joint operation of transceiver 217 and beamformer 218 effectively forms beams for long range transmission/detection.

Each of the transceiver 217 and beamformer 218 can be implemented with commercial off-the-shelf (COTS) equipment, such as a COTS 802.11 transceiver and a multi-element beamformer. For example, in one specific embodiment, the multi-element beamforming array 216 (including transceiver 217 and beamformer 218) is implemented using a MediaFlex™ access point produced by Ruckus Wireless, Inc. This commercially available beamformer has a clam-shell configuration and can be coupled to the system 10 via an Ethernet connection. In another example embodiment, the transceiver 217 and beamformer 218 may be implemented as described in U.S. Pat. No. 7,362,280, which is incorporated herein in its entirety by reference.

The computer 200 can be implemented with conventional technology, including display area 201b (e.g., LCD display), processor 203 (e.g., Intel® Pentium® class processors, or other suitable microprocessors), and memory 205 (e.g., any RAM, ROM, cache, or combination thereof typically present in computing devices). However, as will be explained in turn, the LOB module 207, calibration files 209, and geolocation module 211 are programmed or otherwise configured to carryout functionality described herein. Likewise, user controls provisioned for the user interface 201 (such as controls 201a) may be programmed or otherwise configured to control and/or task the system 10 to carryout functionality described herein. In some specific embodiments, the computer 200 can be implemented, for example, with a miniature or so-called ultra mobile computer, such as the OQO model 2+ produced by OQO, Inc., or the VAIO® UX Series Micro PC produced by Sony Corporation. Any number of small portable computing platforms can be used to implement computer 200.

The LOB module 207 is programmed or otherwise configured to convert a response signal from transceiver 217 into a line of bearing (LOB) relative to the current position and orientation of array 218b. The geolocation module 211 is programmed or otherwise configured to identify the actual location of the target emitter on the LOB, based on the intersection of LOBs from multiple vantage points (e.g., on a map display) and/or GPS position and heading tags associated with each computed LOB. For instance, in the example embodiment shown in FIG. 2a, the system includes GPS module 213 and its corresponding antennas 213a-b, so that each LOB to a target device can be associated with position and heading tags. The GPS module 213 and antennas 213a-b can be implemented with conventional GPS receiver and antenna technology. In one example embodiment, GPS module 213 is implemented with a Crescent® Vector OEM board produced by Hemisphere GPS, Inc. This particular GPS board, which can be operatively coupled to computer 200 by an RS-232 serial port or otherwise integrated into computer 200, provides a GPS compass and positioning system that computes heading and positioning using two antennas for greater precision. Other suitable GPS receivers can be used as well, as will be apparent in light of this disclosure. In any such cases, the geolocation module 211 accumulates bearings provided by GPS module 213 to produce a geolocation, which can then be provided, for instance, on a map display.

The user interface 201, including controls 201a and display 201b, allows the user to control and task the system 10. In one specific case, the LOB results can be mapped or shown on a polar plot to indicate in real time the direction to the target emitter. The user interface 201 may include, for example, a probe button that when pressed or otherwise selected initiates transmission of a stimulus signal by the transceiver 217 and beamformer 218 to a target device, so that the signal response from the device can be received at the antenna array 218b over multiple antenna configurations to provide a sample array of response data for that device. The multiple antenna configurations can be selected, for example, automatically by the control provided to the transceiver 217 and beamformer 218 by computer 200, or by operation of the beamformer 218 itself. The array of response data can then be analyzed by the LOB module 207 to identify an LOB to the target device. In addition, the computer 200 may be configured to direct transceiver 217 to transmit a specific stimulus signal having parameters customized to a given target device. In any such cases, the computer 200 receives the response signals from transceiver 217 for processing by the LOB module 207. The geolocation module 211 can then compute a specific location based on the computed LOBs.

Each of the modules 207 and 211 can be implemented, for example, as a set of instructions or code that when accessed from memory 205 and executed by the processor 203, cause direction finding and geolocation techniques described herein to be carried out. In addition, the user interface 201 can be programmed or otherwise configured to allow for functionality as described herein (e.g., wherein controls 201a are implemented as graphical user interface with touch screen functionality). The calibration files 209 effectively make up entries in a database that can be, for example, any suitable data storage populated with gold-standard response data having a known azimuth to which test data can be correlated. The gold-standard response data may be, for instance, empirical data measured by the system 10 in a multipath environment under known conditions (e.g., where the azimuth/LOB from the antenna array 215b to the target emitter device 50 is known, and a full set of calibration measurements are taken at each known azimuth). Alternatively, the gold-standard response data can be theoretical data (assuming the theoretical data is sufficiently accurate to provide accurate results). In any such cases, the database 209 can be populated with gold standard data for any number of azimuths. The number of azimuths represented in the database 209 can vary depending on factors such as the desired azimuthal resolution and FOV. In one example embodiment, the FOV is assumed to be 360° with a desired resolution of 1° (i.e., 360 azimuths). Other embodiments may have a narrower FOV and/or a finer resolution (e.g., an FOV of 360° and a resolution of 0.1°, wherein there are 3600 azimuths; or an FOV of 180° and a resolution of 1°, wherein there are 180 azimuths; or an FOV of 360° and a resolution of 20°, wherein there are 18 azimuths; or an FOV of 90° and a resolution of 2.0°, wherein there 45 azimuths. As will be appreciated in light of this disclosure, the azimuthal resolution and FOV will depend on the particular demands of the application at hand. The azimuth entry in the database having the calibrated array of data that best matches or otherwise correlates to the measured array of data directly corresponds to the LOB to the target device associated with the measured array of data.

In other embodiments, the calibration files 209, each of the modules 207 and 211, and any graphical user interface (GUI) such as controls 201a, can be implemented in hardware such as purpose-built semiconductor or gate-level logic (e.g., FPGA or ASIC), or otherwise hard-coded. In other embodiments, calibration files 209, modules 207 and 211, and GUI 201a may be implemented with a combination of hardware and software, such as with a microcontroller having input/output capability for providing control signals to transceiver 217 and beamformer 218, and for receiving response data from transceiver 217, and a number of embedded routines for carrying out direction finding and geolocation techniques described herein.

As previously explained, the network detector 215 and its omni-direction antenna 215a can be used to carryout a covert or otherwise transparent survey process to identify various wireless emitters in the FOV of system 10. In one such embodiment, the network detector 215 is implemented with KISMET software executing on processor 203 of computer 200. The omni-directional survey antenna can be implemented, for example, with a Wi-Fi (802.11b/g) PCMCIA card (e.g., whip antenna) that is operatively coupled to computer 200, or otherwise integrated into computer 200 to provide wireless connectivity. The detector 215 detects and interprets information being transmitted by wireless emitters in the FOV, and identifies information such as MAC address, SSID, channel, and current encryption status to be identified. Any number of network detectors can be employed for this surveying purpose.

The optional mapping module 221 can be used to provide map displays upon which computed LOBs and/or geolocation markers can be overlayed or otherwise integrated. In one such embodiment, the mapping module 221 is a satellite based mapping system (e.g., Google Earth™ mapping service) executing on a secondary computer system (e.g., laptop similar to computer 200). Alternatively, the mapping module 221 can be implemented on computer 200. In one such case, the display area 201*b* of the user interface 201 provides a map display area having LOBs and the vehicle path overlayed thereon (assuming a vehicle-based system 10). Other information may also be included, as will be discussed with reference to FIG. 4.

The Ethernet hub 219 can be implemented with conventional technology, and operatively couples various components of system 10 to effectively provide a communication network by which those components can communicate. In the example embodiment shown, each of computer 200, mapping module 221, and multi-element beamforming array 216 are coupled to the Ethernet hub 219 by respective Ethernet ports provided with each. Any number of conventional networking/connectivity technologies can be used here to operatively couple the components of system 10, and embodiments are not intended to be limited to Ethernet based solutions.

Figure 2B:
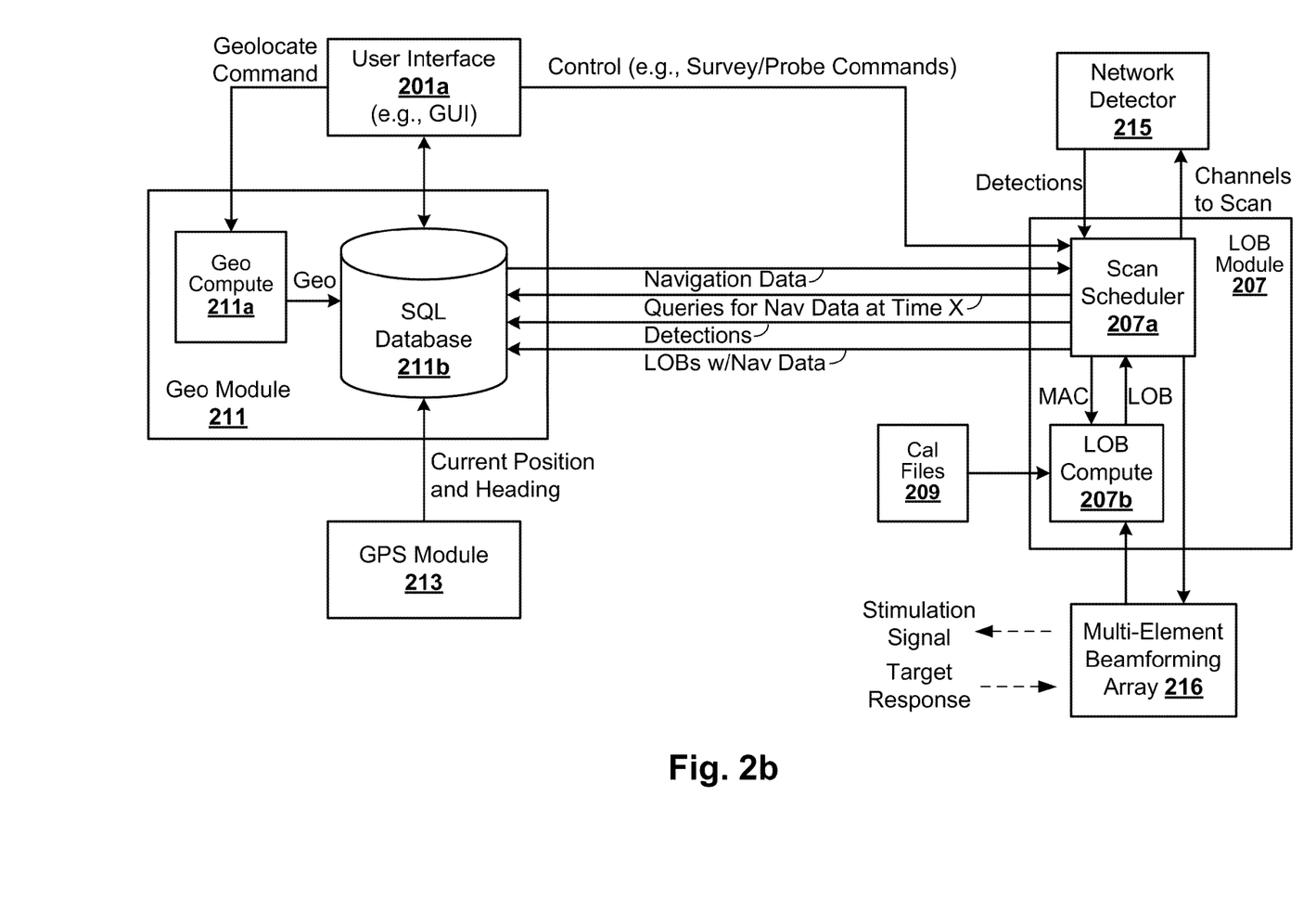
FIG. 2b illustrates further details of the wireless emitter locating system shown in FIG. 2a, configured in accordance with an embodiment of the present invention.

FIG. 2*b* illustrates further details of the wireless emitter locating system 10 shown in FIG. 2*a*, with respect to the geo module 211 and the LOB module 207, in accordance with an embodiment of the present invention. As can be seen, the geo module 211 includes a geo compute module 211*a* and a SQL database 211*b*, and the LOB module 207 includes a scan scheduler 207*a* and an LOB compute module 207*b*. In general, computing multiple LOBs as the system 10 is actively moving (such as the case of a vehicle-based system 10) gives rise to various timing issues and can generate a significant amount of data. For instance, example timing considerations may involve when the next survey and/or target probe should take place and on what channels, and example data includes emitter detections, multiple LOBs, and corresponding navigation data for each of a plurality of points along the travel path of system 10. To this end, the scan scheduler 207*a* directs scheduling of system 10 operations in response to user survey and probe commands (from user interface 201*a*), and SQL database 211*b* efficiently stores (and makes accessible) pertinent data to the system 10.

In more detail, the scan scheduler 207*a* of this example embodiment is programmed or otherwise configured to direct the network detector 215 to survey the FOV of system 10 for wireless emitters. The scheduler 207*a* specifies the channel to survey. For instance, the scheduler may sequentially schedule scans for each available channel associated with a given protocol (e.g., IEEE 802.11). The detector 215 provides any detections for each such survey back to the scan scheduler 207*a*, which then stores those detections (along with any pertinent learned information, such as MAC address, channel, encryption status, etc) in database 211*b*. Note that although SQL technology is used in this example, other suitable database technologies can be used as well. The scan scheduler 207*a* can then select any of the detected emitters (e.g., based on MAC address or other suitable identifier selected by user via user interface 201*a* and indicated in the probe command), and instruct the LOB compute module 207*b* to compute an LOB for that particular emitter at that current location of the system 10. For each LOB provided by module 207*b* to scheduler 207*a*, the scheduler 207*a* queries the database 211*b* for navigation data at that particular time (time X). As can be further seen, the database 211*b* responds by sending the scheduler 207*a* the appropriate navigation data. The scheduler 207*a* then stores the LOB along with its corresponding navigation data to the database 211*b*. In the example embodiment shown, scan scheduler 207*a* also directs the beamforming array 216 in conjunction with module 207*b*. In alternative configurations, module 207*b* can direct beamforming array 216 after scheduler 207*a* instructs module 207*b*. Additional details of how module 207*b* operates and interacts with the cal files 209 and beamforming array 216 are provided with reference to FIGS. 5*a-c*.

As previously explained, the GPS module 213 provides current heading and position data, which is also stored in the database 211*b* and made available the LOB module 207. The geo compute module 211*a* is programmed or otherwise configured to compute, in response to a geolocate command from the user (via interface 201*a*), a geolocation for the specified target emitter. As previously explained, the geolocation can be computed based on the intersection of the corresponding LOBs and/or the navigation data (position/heading tags) associated with those LOBs. The computed geolocation can then be stored in the database 211*b* by module 211*a*.

Figure 2C:
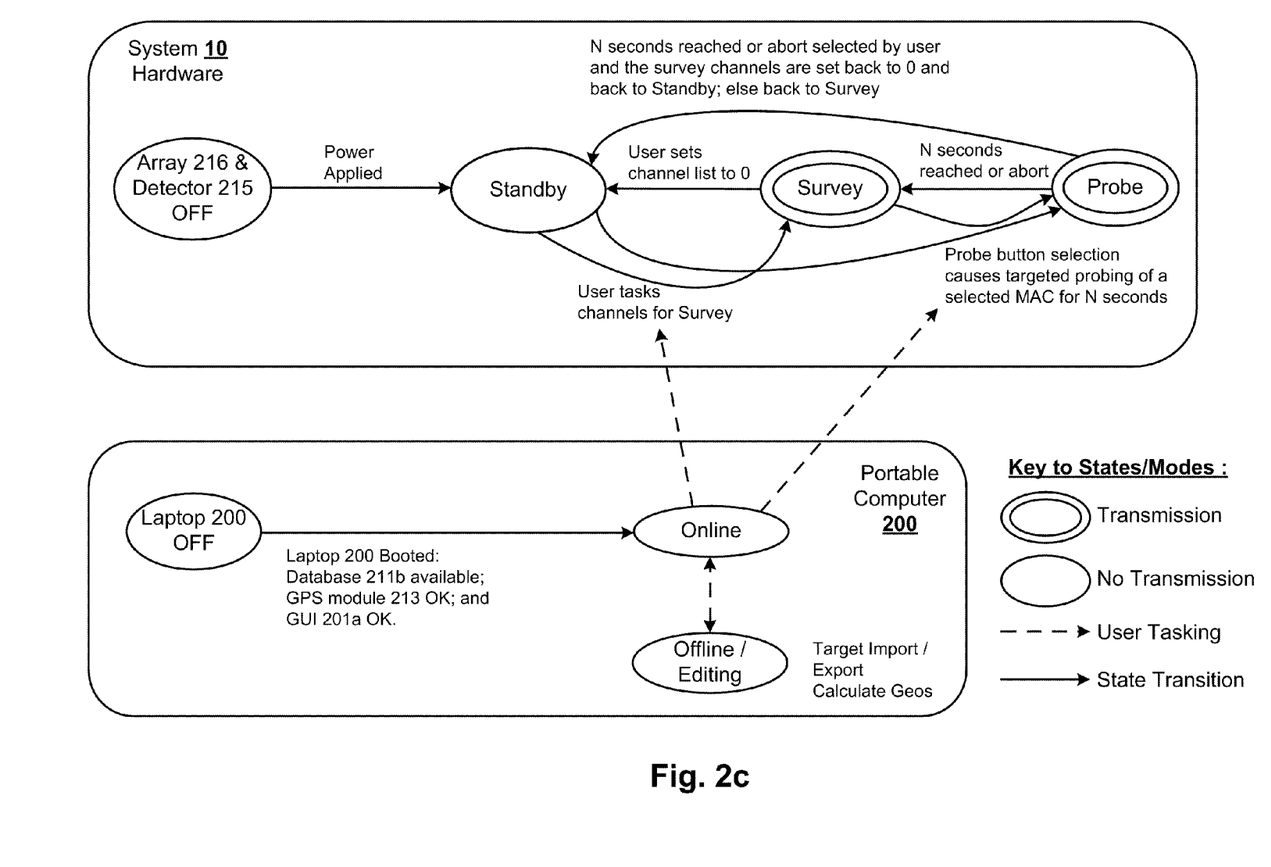
FIG. 2c illustrates example states and modes of the wireless emitter locating system shown in FIG. 2a, in accordance with an embodiment of the present invention.

FIG. 2*c* illustrates example states and modes of the wireless emitter locating system 10 shown in FIG. 2*a*, in accordance with an embodiment of the present invention. As can be seen, the diagram includes two main portions: one for the computer 200 (which is a laptop in this example) and another for other hardware (detector 215 and array 216) of system 10. At power-up, the system 10 transitions from its OFF state to its Online state, whereupon the database 211*b* becomes available and modules 201*a* and 213 come online. During an Offline/Editing state, only the computer 200 (with its modules and database 211*b*) may be powered-on (e.g., leave module 213 powered-down or in low power mode to conserve power), which allows for offline tasks such as importing/exporting data and computing of geolocations.

Once computer 200 is in its Online state, the user may task system 10 hardware to survey, probe, etc. To conserve power, note that detector 215 and array 216 can be powered-down or held in a low power mode during extended periods of not receiving any user tasks. Once a task is received, the system 10 can transition from a Standby state to either a Survey state or a Probe state, depending on the user task received. For instance, if the survey button (or other user interface mechanism) is selected, the system transitions to the Survey state where available channels are surveyed for wireless emitters. The channels to survey can be automatically selected (e.g., by operation of scheduler 207*a* as previously described), or specified by the user. In one such case, after the survey is complete, the user can select a new set of channels for survey, or set the channels list to 0 (i.e., no further surveying). As can be further seen, selecting the probe button (or other user interface mechanism) causes system 10 to transition to the Probe state for targeted probing of an emitter having a specified MAC address. If after N seconds (e.g., 5 to 15 seconds) no response is received from the targeted emitter, system 10 may transition back to the Survey state in effort to identify other emitters in the FOV or to correct identifying information associated with the target emitter. Alternatively, the system 10 can transition back to the Standby state. Any number of timing/abort schemes for controlling state transition can be used here.

Figure 3A:
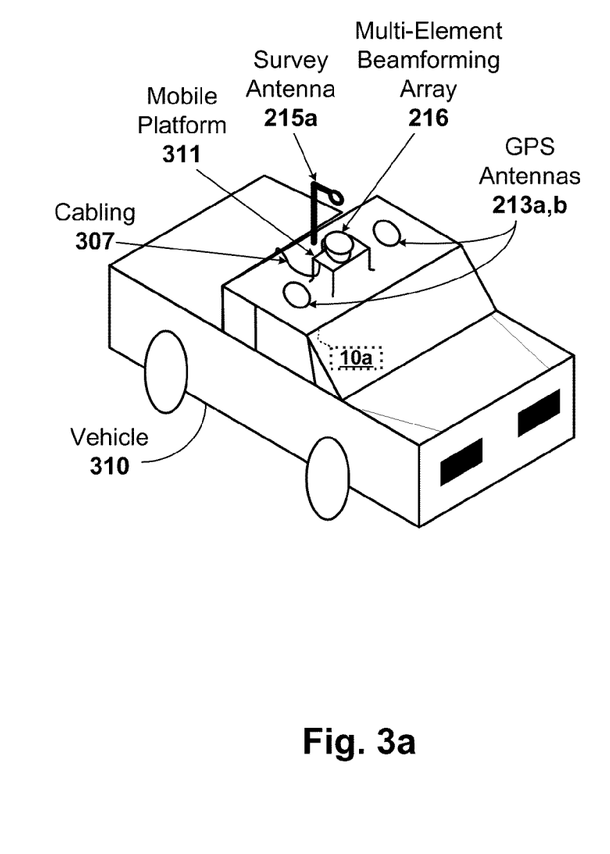
FIGS. 3a and 3b illustrate a vehicle-based version of the wireless emitter locating system shown in FIG. 2a, configured in accordance with an embodiment of the present invention.
Figure 3B:
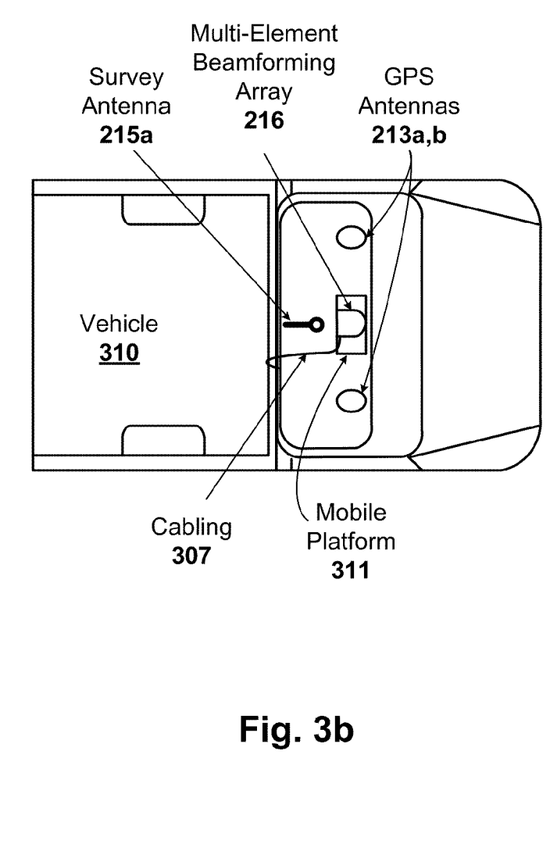

FIGS. 3a and 3b illustrate a vehicle-based version of the wireless emitter locating system 10 shown in FIG. 2a, configured in accordance with an embodiment of the present invention. As can be seen, the system 10 includes inside vehicle componentry 10a (as best shown in FIG. 2a), a multi-element beamforming array 216, GPS antennas 213a-b, and survey antenna 215a as previously discussed with reference to FIG. 2a, and that previous discussion is equally applicable here. In addition to these components, this embodiment further includes a mobile platform 311 and cabling 307. The vehicle 310 can be any type of suitable vehicle given the particular application at hand, and numerous deployment schemes for system 10 will be apparent in light of this disclosure.

In this example embodiment, the platform 311 is used to support a clam-shell configuration that houses the multi-element beamforming array 216. The cabling 307 is for operatively coupling the outer vehicle componentry to the inside vehicle componentry 10a, and may include a bound cable harness or a number of independent dedicated cables operatively coupled between respective components. The clam-shell assembly including the beamforming array 216 can be implemented, for example, using a MediaFlex™ access point produced by Ruckus Wireless, Inc. As previously explained, the user interface 201 can be used to task or otherwise activate system functions. Any number of user interface and activation mechanisms may be implemented to allow for control and/or tasking of the system 10, as will be apparent in light of this disclosure.

Figure 4:
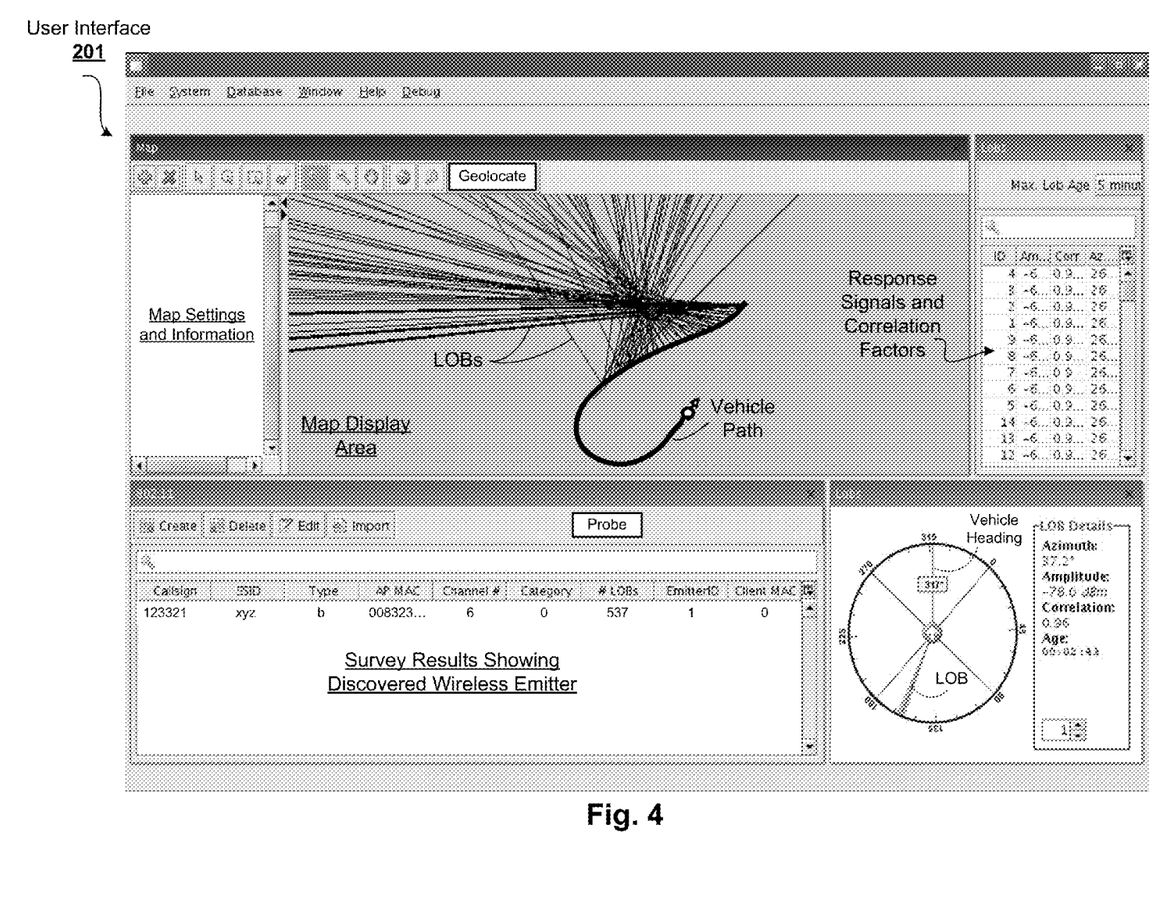
FIG. 4 illustrates an example user interface of the wireless emitter locating system shown in FIG. 2a, in accordance with an embodiment of the present invention.

FIG. 4 illustrates an example user interface 201 of the wireless emitter locating system 10 shown in FIG. 2a, in accordance with an embodiment of the present invention. As can be seen, the interface 201 is implemented within a browser and includes a map display area for displaying multiple LOBs computed by the system 10 as well as the vehicle's path. Map setting and information can also be provided, to allow the user to configure the map as desired (e.g., to show more or few details, zoom level, labels, etc).

An LOB resulting from the process carried out by LOB module 207 is visually depicted on a polar plot, along with the vehicle heading, to indicate in real-time the direction to the target device relative to the current position and orientation of array 216. As can be further seen, specific LOB details may also be displayed to ease the user's viewing, if so desired.

Also shown above the LOB polar plot are response signals and the corresponding correlation factors computed by the system 10 as described herein. As can be seen, each response signal parameter of amplitude (Am . . . ) that has been measured has an ID value and corresponds to a computed correlation factor (Corr.) and a corresponding azimuthal (Az . . . ) value. The user may search this data and/or scroll the data for review. In this specific example, the user can also specify a maximum LOB age (to prevent stale readings), if so desired.

The interface 201 of this example further includes a section for survey results showing discovered wireless emitters and corresponding information associated with each such emitter. The information includes, for instance, a callsign, SSID, type of emitter (e.g., 802.11b, 802.11g, etc), MAC address, communication channel, category (e.g., 0 =unencrypted; 1 =encrypted), the number of LOBs computed for that emitter (if any), emitter ID (if assigned), and the client MAC (which may be helpful in embodiments where there is more than one system 10 providing information, such as described in the previously incorporated U.S. application Ser. No. 12/487, 485.

The interface 201 of this example further includes a Probe button (e.g., touch screen activated or otherwise selectable by the user) for initiating a probing task of a selected emitter device. The interface 201 may also include a Survey button to initiate surveys. Other embodiments may combine the tasking functions for Probing and Survey into a single button. The interface further includes a Geolocate button, which initiates a geolocation computation for a selected emitter based on its LOBs and associated navigation data.

Line of Bearing Determination

Figure 5A:
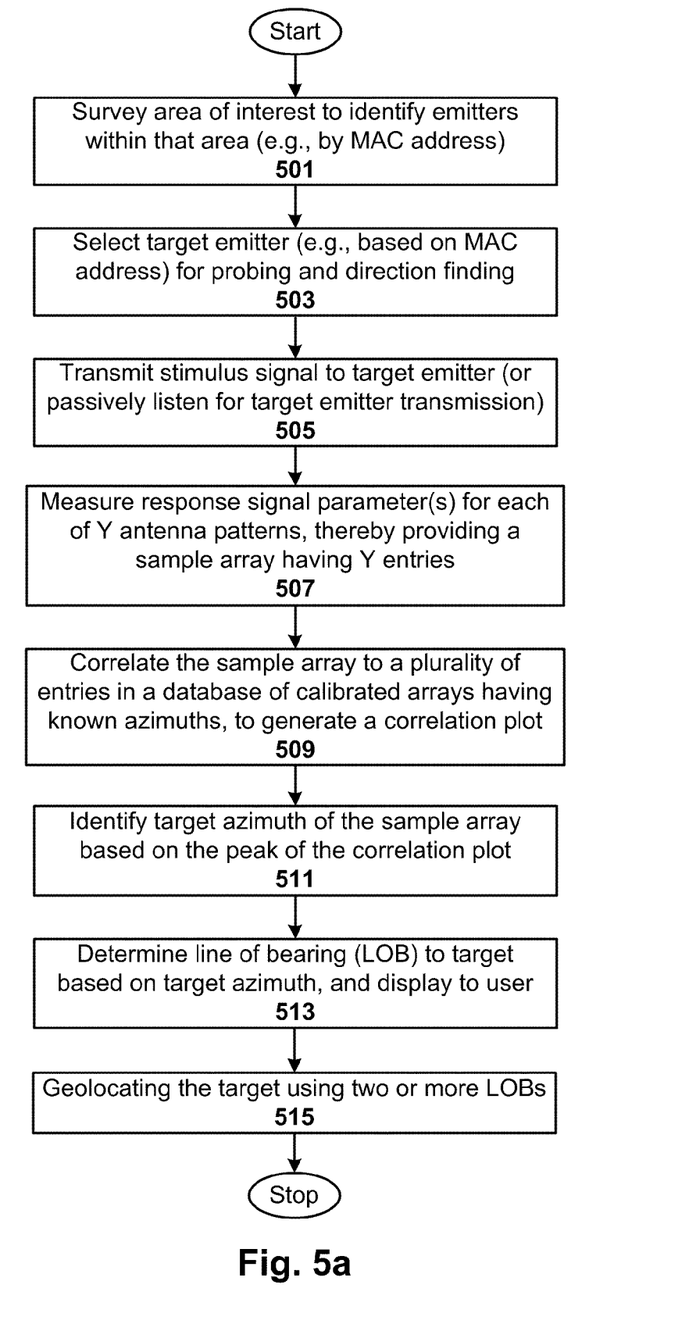
FIG. 5a illustrates a method for determining a line of bearing to a wireless emitter, and geolocating that emitter, in accordance with an embodiment of the present invention.

FIG. 5a illustrates a method for determining an LOB to a wireless emitter and geolocating that emitter based on multiple LOBs, in accordance with an embodiment of the present invention. As previously explained, the method can be carried out, for example, by system 10.

The method begins with surveying 501 the area of interest to identify wireless emitters within that area (e.g., by MAC address, and/or other suitable identifiers). The user can task this survey, for example, using the user interface 201 (e.g., survey button on graphical user interface that is coded to generate control signals commanding the transceiver 217 and beamformer 218 to transmit the survey signal). Note that this step may be done contemporaneously with remaining portions of the method, or at any time prior to the remaining portions.

The method continues with selecting 503 a target emitter discovered during the survey (e.g., based on the target device's MAC address or other suitable identifier, and using the channel associated with that emitter) for probing to direction find and geolocate that emitter. The user can task this probing of the target device, for example, using the user interface 201 (e.g., user can select the target emitter using graphical user interface that is coded to display a list of emitters identified during the survey, and then user can select probe button on graphical user interface that is coded to generate control signals commanding the transceiver 217 and beamformer 218 to transmit the probe signal).

The method continues with transmitting 505 a stimulus signal to the target emitter. Recall that computer 200 of system 10 may be configured to direct transceiver 217 to transmit a specific stimulus signal having parameters customized to a given target device, if so desired (e.g., as commanded by LOB module 207). Alternatively, the stimulus signal can be any signal that causes the target emitter to provide a response signal that can be detected and processed by system 10 as described herein. In some cases, no stimulus signal is required if, for example, a given target device automatically broadcasts or otherwise transmits its information (such voluntary signals can be considered a 'response' as well, for purposes of this disclosure). In such cases, the system executing the method can passively listen for target emitter transmissions.

The method continues with measuring 507 the response signal parameter (or parameters) for each of Y antenna patterns, thereby providing a Y sample array of response data. As previously explained, the antenna array 218b is configured with a number of elements that can be selected by switching network 218a to provide various antenna configurations. In one example case, the antenna has six horizontally-polarized elements, thereby providing $2^6$ different configurations (i.e., Y=64). In another example case, the antenna has six horizontally-polarized and vertically-polarized elements, thereby providing $2^{12}$ different configurations (i.e., Y=4096).

Figure 5B:
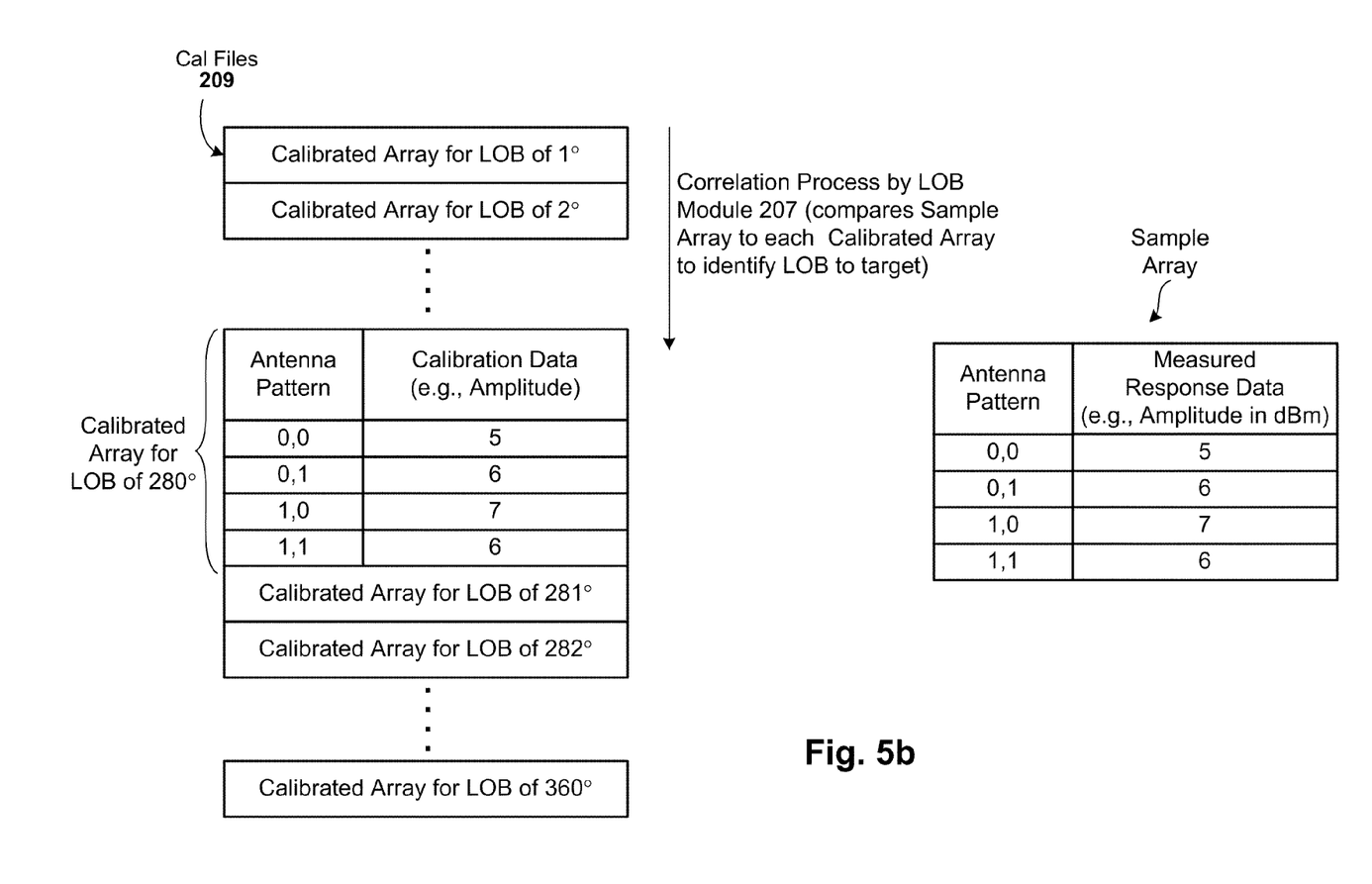
FIG. 5b illustrates a correlation process carried out by the method of FIG. 5a, to identify which calibrated array best matches a sample array, in accordance with an embodiment of the present invention.
Figure 5C:
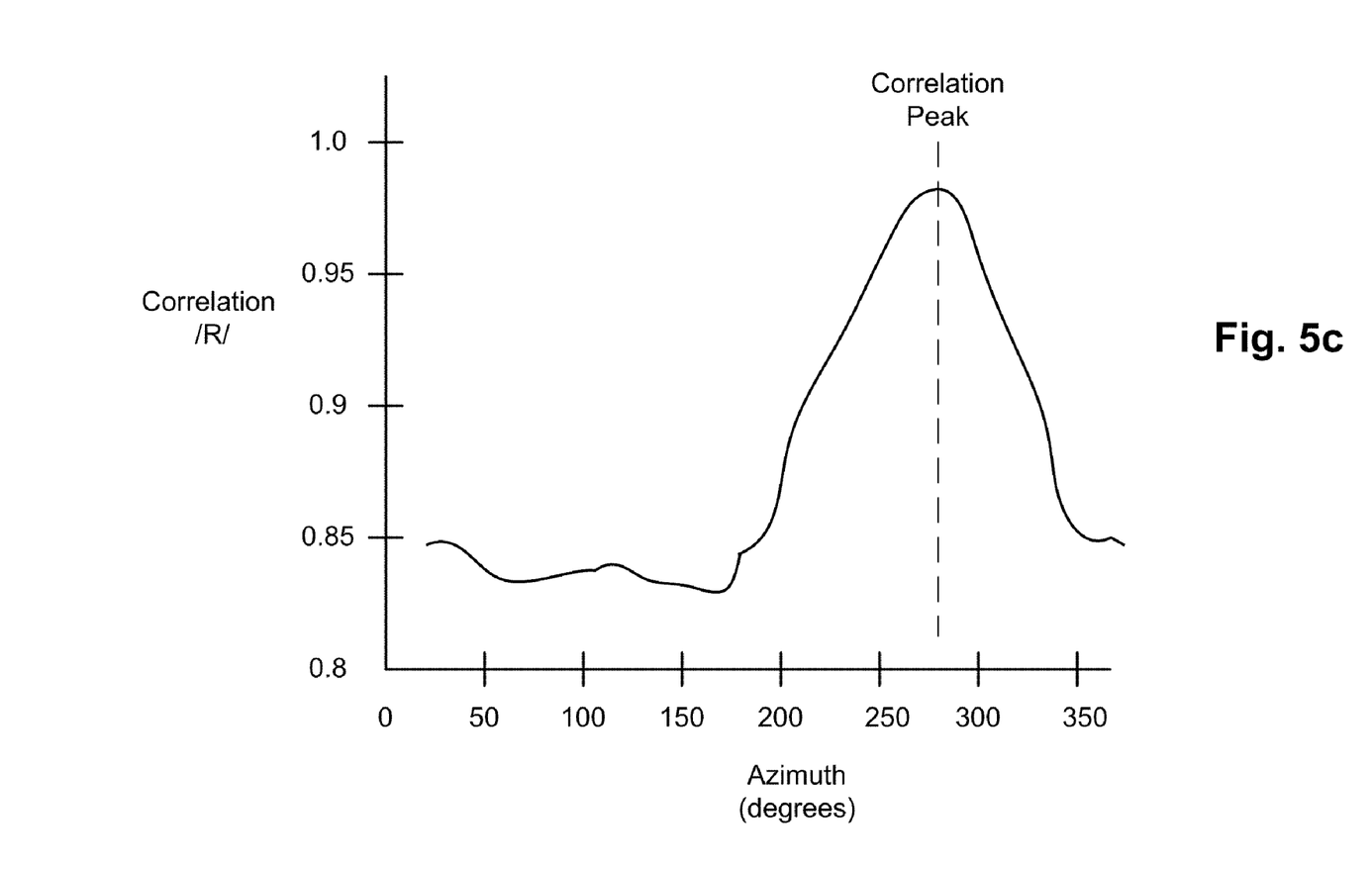
FIG. 5c illustrates a correlation scan or plot of correlation coefficients resulting from the correlation process shown in FIG. 5b, and having a peak that corresponds to an azimuth (or LOB) to the target, in accordance with an embodiment of the present invention.

The method continues with correlating 509 the sample array to a plurality of entries in a database of calibrated arrays having known azimuths, to generate a correlation plot. This process can be carried out, for example, by the LOB module 207, or a dedicated correlation module. As is generally known, a correlation process measures how well two populations match one another. Any conventional correlation technique can be used to perform this correlation, where such techniques typically provide a correlation factor between 0 (low correlation) and 1 (high correlation). FIG. 5b illustrates a correlation process to identify which calibrated array best matches a sample array, in accordance with an embodiment of the present invention. As can be seen, the cal files 209 include 360 calibrated arrays, one for each LOB ranging from 1° to 360° (with a 1° resolution). In this example of FIG. 5b, the antenna array has two elements capable of providing four distinct antenna patterns (indicated as 0,0; 0,1; 1,0; and 1,1). Thus, once the sample array of response data is provided by the transceiver 217 to the computer 200, that sample array can be compared against the cal files 209 to generate a correlation factor for each comparison. Each of these correlation factors can then be plotted to provide a correlation scan or plot as shown in FIG. 5c. The peak of the correlation plot corresponds to an azimuth (or LOB) to the target emitter. Note that LOB is effectively interchangeable with azimuth in this context.

The method therefore continues with identifying 511 the target azimuth of the sample array based on the peak of the correlation plot, and determining a line of bearing (LOB) to target based on the target azimuth. In the example of FIGS. 5b and 5c, the sample array best matches the cal file 209 corresponding to the LOB of 280°. As will be appreciated, the number of azimuths and antenna patterns used for this example was selected for ease of depiction. Other embodiments may have any number of azimuths (represented in cal file 209) and/or antenna patterns. In any such case, the target LOB can be graphically displayed to the user (e.g., as shown in FIG. 4).

The method continues with geolocating 515 the target emitter based on two or more LOBs, from multiple vantage points. In one such embodiment, this geolocation is carried out by the user moving to a second location and then repeating steps 505 through 513 to get a second LOB to target. The user may repeat at any number of additional locations, providing an LOB at each location. The user may collect such LOBs at multiple points, for instance, along an L-shaped path, or other path that will allow for geolocation based on LOBs to be carried out. The computed LOBs can be stored, for example, in a memory of computer 200, and/or displayed to the user as shown in FIG. 4 (along with travel path). Alternatively, the user can manually plot the LOBs. In any such cases, the LOBs will generally intersect. The more LOBs provided to the target, the more robust and accurate the intersection will be. The user can then translate this intersection to a geographic location, using conventional geolocation techniques. As previously explained, each LOB may be further associated with position and heading data (from navigation system), which can also be used to readily and accurately geolocate the target emitter.

The foregoing description of the embodiments of the invention has been presented for the purposes of illustration and description. It is not intended to be exhaustive or to limit the invention to the precise form disclosed. Many modifications and variations are possible in light of this disclosure. For instance, some embodiments are discussed in the context of a ground vehicle-based device. Other example embodiments may be any vehicle-based (e.g., airplane, ship, etc). Still other example embodiments may be backpack-based, such that a user can don the backpack and control and task system using a wired or wireless remote having a small display screen to allow user to see computed LOBs/geolocation results. Alternatively, such a backpack-based system can be configured to respond to voice commands, and aurally present computed LOBs/geolocation results so that user's hands remain free. It is intended that the scope of the invention be limited not by this detailed description, but rather by the claims appended hereto.

What is claimed is:

1. A method for geolocating a wireless emitter, the method comprising:
   transmitting a stimulus signal to a target wireless emitter using a known physical address associated with that target wireless emitter to stimulate a response signal from the target wireless emitter;
   measuring one or more response signal parameters for each of Y antenna patterns, thereby providing a Y sample array of response data from the target wireless emitter, wherein Y is greater than 1;
   correlating the sample array to a plurality of entries in a database of calibrated arrays having known azimuths, to determine a line of bearing (LOB) to the target wireless emitter;
   repeating the transmitting, measuring and correlating to determine one or more additional LOBs to the target wireless emitter, each LOB computed from a different geographic location; and
   geolocating the target wireless emitter based on the LOBs.

2. The method of claim 1 further comprising the preliminary steps of:
   surveying an area of interest to identify wireless emitters within that area; and
   selecting a target emitter discovered during the survey.

3. The method of claim 2 wherein the transmitting includes transmitting the stimulus signal to the target emitter using a media access control (MAC) address and communication channel associated with the target emitter learned during the survey.

4. The method of claim 1 wherein the correlating comprises:
   generating a correlation plot having a peak using correlation factors resulting from correlation of the sample array to the plurality of entries in the database;
   identifying a target azimuth of the sample array based on the peak of the correlation plot; and
   determining the LOB to the target wireless emitter based on the target azimuth.

5. The method of claim 1 wherein each of the LOBs is associated with position and heading tags provided by a global positioning satellite (GPS) module to assist in geolocating the target wireless emitter.

6. The method of claim 1 further comprising:
   graphically displaying the LOBs to the target wireless emitter.

7. The method of claim 1 further comprising:
   storing the geolocation of the target wireless emitter.

8. The method of claim 1 wherein there are 64 or 4096 antenna patterns.

9. The method of claim 1 wherein the one or more response signal parameters include response signal amplitude.

10. The method of claim 1 wherein the method is carried out using a vehicle-based system, unmanned aerial vehicle, or a backpack-based system.

11. A system for geolocating a wireless emitter, the system comprising:
- a switchable antenna array for measuring one or more signal parameters for each of Y antenna patterns, thereby providing a Y sample array of signal data from a target wireless emitter, wherein Y is greater than 1;
- a line of bearing module for correlating the sample array to a plurality of entries in a database of calibrated arrays having known azimuths, to determine a line of bearing (LOB) to the target wireless emitter; and
- a geolocation module for geolocating the target wireless emitter based on multiple LOBs to the target wireless emitter, each LOB computed from a different geographic location.

12. The system of claim 11 wherein the system is further configured for surveying an area of interest to identify wireless emitters within that area, the system further comprising:
- a user interface for allowing a user to select a target emitter discovered during the survey.

13. The system of claim 12 wherein the target emitter is associated with a media access control (MAC) address and communication channel learned during the survey, and the system further comprises a transceiver configured for transmitting a stimulus signal to the target emitter using the MAC address and communication channel.

14. The system of claim 11 wherein the line of bearing module is configured for generating a correlation plot having a peak using correlation factors resulting from correlation of the sample array to the plurality of entries in the database, and identifying a target azimuth of the sample array based on the peak of the correlation plot, and determining the LOB to the target wireless emitter based on the target azimuth.

15. The system of claim 11 wherein each of the LOBs is associated with position and heading tags provided by a global positioning satellite (GPS) module to assist in geolocating the target wireless emitter.

16. The system of claim 11 further comprising:
- a user interface for graphically displaying the LOBs to the target wireless emitter.

17. The system of claim 11 further comprising:
- a database for storing the geolocation of the target wireless emitter.

18. The system of claim 11 wherein the system is configured for at least one of vehicle-based operation, unmanned aerial vehicle operation, backpack-based operation, and/or hands-free operation.

19. The system of claim 11 wherein the target wireless emitter is associated with a physical address, the system further comprising:
- a transmitter for transmitting a stimulus signal to the target wireless emitter using the physical address to stimulate a response signal from the target wireless emitter, the response signal having the one or more signal parameters.

20. The system of claim 11 wherein the switchable antenna array includes a plurality of elements, the system further comprising:
- a switching network for selecting the elements to provide each of the Y antenna patterns.

21. The system of claim 20 wherein the switchable antenna array includes both vertically-polarized and horizontally-polarized elements.

22. The system of claim 11 wherein the database has an azimuthal resolution of 1 degree or higher.

23. The system of claim 11 wherein the geolocation module is configured for geolocating the target wireless emitter based at least in part on an intersection of the multiple LOBs.

24. The system of claim 17 wherein the database for storing the geolocation of the target wireless emitter is an on-line accessible database of publicly accessible access points.

25. A vehicle-based system for geolocating a wireless emitter, the system comprising:
- a user interface for allowing a user to select a target emitter discovered during a survey conducted by the system, wherein the target emitter is associated with a media access control (MAC) address and communication channel learned during the survey;
- a transceiver for transmitting a stimulus signal to a target wireless emitter using the MAC address and communication channel;
- an antenna array for measuring one or more response signal parameters for each of Y antenna patterns, thereby providing a Y sample array of response data from the target wireless emitter, wherein Y is greater than 1, and the one or more response signal parameters include response signal amplitude;
- a line of bearing module for correlating the sample array to a plurality of entries in a database of calibrated arrays having known azimuths, to determine a line of bearing (LOB) to the target wireless emitter;
- a geolocation module for geolocating the target wireless emitter based on multiple LOBs to the target wireless emitter, each LOB computed from a different geographic location; and
- a user interface for graphically displaying the LOBs to the target wireless emitter.

26. The system of claim 25 wherein the line of bearing module is configured for generating a correlation plot having a peak using correlation factors resulting from correlation of the sample array to the plurality of entries in the database, and identifying a target azimuth of the sample array based on the peak of the correlation plot, and determining the LOB to the target wireless emitter based on the target azimuth.

* * * * *